US009778400B2

(12) United States Patent
Ndukaife et al.

(10) Patent No.: US 9,778,400 B2
(45) Date of Patent: Oct. 3, 2017

(54) SYSTEM AND METHOD FOR MANIPULATION OF PARTICLES

(71) Applicant: PURDUE RESEARCH FOUNDATION, West Lafayette, IN (US)

(72) Inventors: Justus Chukwunonso Ndukaife, West Lafayette, IN (US); Alexandra Boltasseva, West Lafayette, IN (US); Agbai A. Nnanna, Crown Point, IN (US); Steven Truitt Wereley, West Lafayette, IN (US); Alexander Kildishev, West Lafayette, IN (US); Vladimir M. Shalaev, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 0 days.

(21) Appl. No.: 15/183,382

(22) Filed: Jun. 15, 2016

(65) Prior Publication Data

US 2016/0370316 A1   Dec. 22, 2016

Related U.S. Application Data

(60) Provisional application No. 62/181,393, filed on Jun. 18, 2015.

(51) Int. Cl.
*G01N 27/00*   (2006.01)
*G02B 5/00*   (2006.01)

(52) U.S. Cl.
CPC .................. *G02B 5/008* (2013.01)

(58) Field of Classification Search
None
See application file for complete search history.

(56) References Cited

U.S. PATENT DOCUMENTS 9,443,632 B2* 9/2016 Wereley ................ G21K 1/006
2015/0380120 A1* 12/2015 Wereley ................ G21K 1/006
250/251

OTHER PUBLICATIONS

Roxworthy et al. ("Application of Plasmonic Bowtie Nanoantenna Arrays for Optical Trapping, Stacking, and Sorting", American Chemical Society Nano Letters, pp. 796-801, published Dec. 30, 2011).*

* cited by examiner

*Primary Examiner* — Andrew Smyth
(74) *Attorney, Agent, or Firm* — Hartman Global IP Law; Gary M. Hartman; Domenica N. S. Hartman

(57) ABSTRACT

A system and method suitable for selection, manipulation, and analysis of individual particles within a fluid medium. The system and method involve manipulating the particles by contacting the fluid medium with a plasmonic nanoantenna, illuminating the plasmonic nanoantenna with a source of light such that the plasmonic nanoantenna acts as a nanoscale heat source resulting in localized heating of the fluid medium creating local gradients in the electrical properties of the fluid medium that yield plasmonic trapping sites in the vicinity of the plasmonic nanoantenna, and applying an alternating current electric field in the fluid medium to create electrothermoplasmonic flow around the plasmonic nanoantenna. The electrothermoplasmonic flow transports at least one of the particles towards the plasmonic nanoantenna and the particle is trapped by at least one of the plasmonic trapping sites.

17 Claims, 17 Drawing Sheets

SYSTEM AND METHOD FOR MANIPULATION OF PARTICLES

CROSS REFERENCE TO RELATED APPLICATIONS

This application claims the benefit of U.S. Provisional Application No. 62/181,393, filed Jun. 18, 2015, the contents of which are incorporated herein by reference.

STATEMENT REGARDING FEDERALLY SPONSORED RESEACH

This invention was made with government support under contract no. DMR1120923 awarded by the National Science Foundation. The government has certain rights in the invention.

BACKGROUND OF THE INVENTION

The present invention generally relates to selection, manipulation and analysis of nanometer-sized structures. The invention particularly relates to nanotweezer systems and devices.

A brief overview of current techniques and tools relating to optical trapping and manipulation of nanometer-sized (nanoscale) structures are described in an article titled "Optical trapping and manipulation of nanostructures" by Onofrio M. Marago et al. published online in Nature Nanotechnology, Volume 8, November 2013, the contents of which are incorporated herein by reference in their entirety. As used herein, the terms nanometer-sized structures and nanoscale structures (also referred to as nanostructures) will be used to denote materials having at least one dimension of less than one micrometer.

Plasmonic nanoantennas (which may be but are not required to be nanostructures) capable of producing highly localized and intensified electromagnetic fields are at the core of very active research directed towards the efficient trapping of nanoscale objects and their manipulation, which as yet has not been resolved with conventional diffraction-limited optical tweezers (nanotweezers) adapted to trap nanoscale particles (nanoparticles). As such, there is ongoing research for methods of delivering a single suspended nanoscale particle towards a given addressable plasmonic nanoantenna with the intension of trapping the particle by optical gradient forces.

There are two fundamental approaches conventionally employed for the trapping of particles with nanoantennas. The first approach involves illuminating periodic arrays of closely-spaced nanoantennas. In this approach, collective heating from the nanoantennas produces strong fluid convection and thermophoresis that exerts drag forces on the particles. Despite a relatively fast fluid motion (for example, up to 1 μm/s), this technique suffers from the issue of particle agglomeration, which prevents plasmonic trapping of individual particles at a given hotspot. The second approach involves the illumination of a single nanoantenna. Here, collective heating is absent, and the temperature is localized at the illuminated nanoantenna. As a result, the thermoplasmonic convection is extremely weak (<10 nm/s), and the trapping force is primarily provided by the optical gradient force of the nanoantenna. The motion of the suspended particles becomes diffusion-limited and only particles in close proximity to the nanoantenna can be effectively trapped. This can be a very slow process that may take several hours depending on how dilute the fluid medium is. In this manner, individual nanoparticles can be addressed at the cost of a reduced control over the motion of the suspended particles.

The two approaches described above are limited in that they individually result in high concentration or low speed of delivery of the particles. Consequently, neither approach provides a solution for rapid delivery of individual particles to addressable plasmonic hotspots.

With respect to positioning particles in the vicinity of hotspots, one particular conventional technique involves using a tip of an atomic force microscope (AFM) to physically pick up, move, and drop a particle at the hotspot. This AFM pick and place procedure is very complicated and requires expensive instrumentation.

In view of the above, it can be appreciated that there are certain problems, shortcomings or disadvantages associated with the prior art, and that it would be desirable if methods and systems were available for rapid delivery of individual particles to specifically addressable plasmonic hotspots on-demand and achieve high resolution trapping of such particles without persistent perturbing convection and thermophoretic forces.

BRIEF DESCRIPTION OF THE INVENTION

The present invention provides systems and methods suitable for selection, manipulation, and analysis of individual particles, particularly nanoscale particles, within a fluid medium.

According to one aspect of the invention, a system for manipulating nanoscale particles includes a fluid medium comprising the particles, a plasmonic nanoantenna in contact with the fluid medium, a source of light to illuminate the plasmonic nanoantenna and excite localized surface plasmons in the vicinity of the plasmonic nanoantenna, and means for applying an alternating current electric field in the fluid medium. Simultaneous illumination of the plasmonic nanoantenna and application of the electric field causes electrothermoplasmonic flow in the fluid medium that transports at least one of the particles towards the plasmonic nanoantenna and the at least one particle is trapped by optical gradient forces in the vicinity of the plasmonic nanoantenna.

According to another aspect of the invention, a method of manipulating nanoscale particles includes contacting a fluid medium containing the particles with a plasmonic nanoantenna, illuminating the plasmonic nanoantenna with a source of light such that the plasmonic nanoantenna acts as a nanoscale heat source resulting in localized heating of the fluid medium creating local gradients in the electrical properties of the fluid medium that yield plasmonic trapping sites in the vicinity of the plasmonic nanoantenna, and applying an alternating current electric field in the fluid medium to create electrothermoplasmonic flow around the plasmonic nanoantenna. The electrothermoplasmonic flow transports at least one of the particles towards the plasmonic nanoantenna and the at least one particle is trapped by at least one of the plasmonic trapping sites.

Technical effects of the system and method described above preferably include the ability to rapidly deliver an individual particle to a specific location and trap the particle at the location without the persistent perturbing convection and thermophoretic forces experienced with conventional plasmonic nanotweezers.

Other aspects and advantages of this invention will be better appreciated from the following detailed description.

DETAILED DESCRIPTION OF THE INVENTION

The present invention generally provides systems and methods for the selection, manipulation, and analysis of nanoscale particles, elements, objects, and structures (collectively referred to herein as particles). The systems and methods preferably provide the capability of rapid, that is, greater than one micrometer per second, delivery of particles to plasmonic trapping sites (or plasmonic trapping potential wells) and high resolution stable trapping of the particles within the trapping sites. In this context, high resolution stable trapping refers to (i) an ability to trap a single particle at a given trapping site, rather than, for example an agglomeration of multiple particles, and/or (ii) an ability to create and trap particles at two or more trapping sites that are separated on a scale below half of the wavelength of light in a given medium (diffraction limit). Such capabilities are provided by a combination of electric current application and nanoantenna illumination, that is, photo-induced heating, which causes motion and trapping of particles within a fluid medium.

Figure 1:
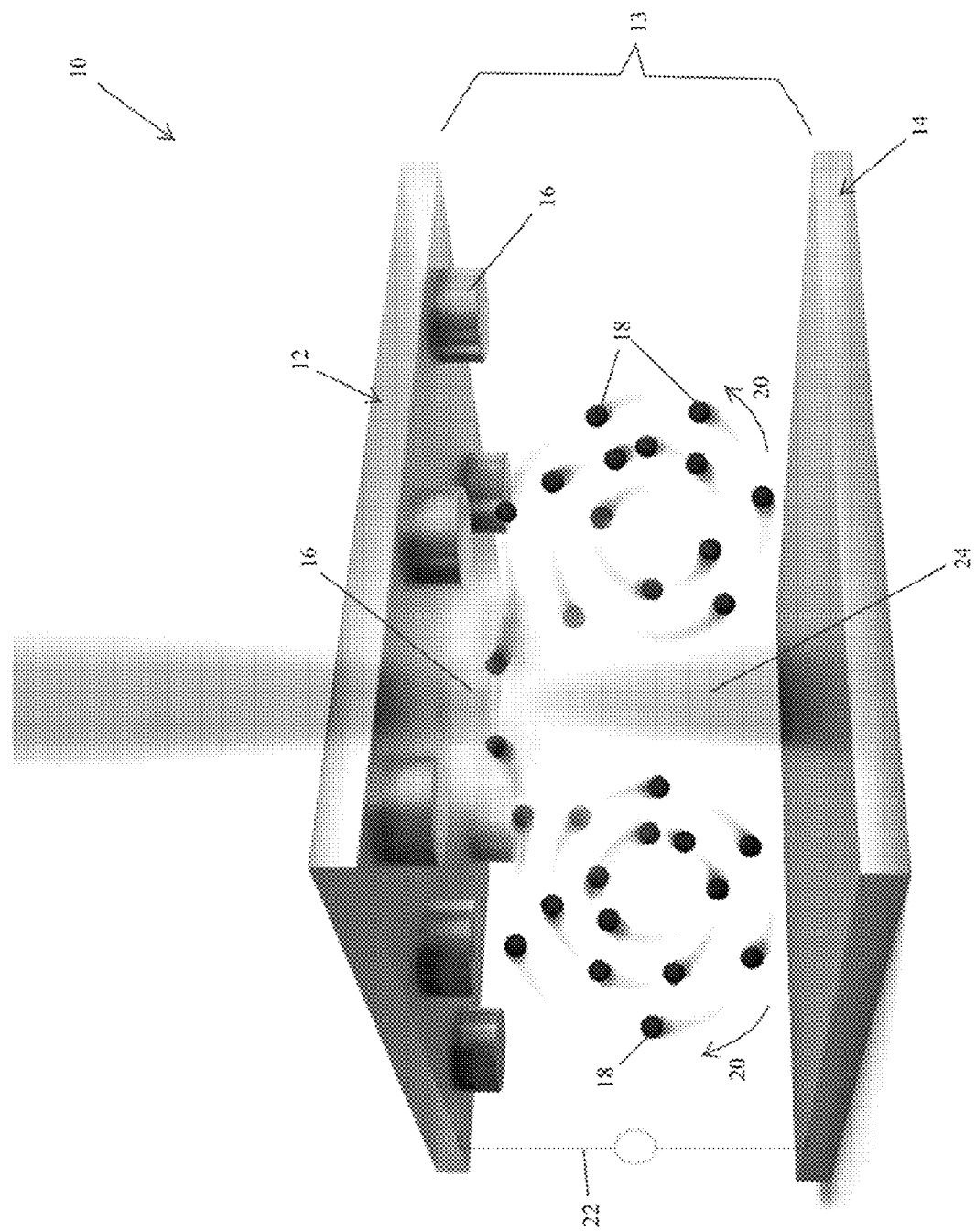
FIG. 1 schematically represents a hybrid electroplasmonic nanotweezer (HENT) device according to a first nonlimiting embodiment of the invention.

FIG. 1 represents a nonlimiting device, referred to herein as a hybrid electroplasmonic nanotweezer (HENT) device 10, comprising first and second substrates 12 and 14, respectively, having a space or channel 13 therebetween comprising particles 18 suspended in a fluid medium therein. Preferably, the channel 13 is a microchannel formed in an insulating spacer (not shown) separating the first and second substrates 12 and 14. The first substrate 12 includes a plurality of nanoantennas 16 thereon that are in direct contact with the fluid medium. The first and second substrates 12 and 14 are coupled with an electrical connection 22 such that an electrical current may be applied to electrically conductive layers thereof with a power source (not shown).

Initially, a single nanoantenna 16 is illuminated with a light source and, simultaneously, an alternating current (AC) is applied to the connection 22 to generate an AC electric field within the fluid medium. The combination of the illuminated nanoantenna 16 and the AC electric field results in hydrodynamic drag within the fluid medium due to creation of free charges resulting from local heating of the fluid medium by the nanoantenna 16 and the presence of the electric field. The hydrodynamic drag promotes what is referred to herein as electrothermoplasmonic (ETP) flow which is a circular flow or vortex (represented with arrows 20) within the fluid medium. The ETP flow captures particles 18 suspended within the fluid medium and transports the particles 18 towards the illuminated nanoantenna 16. Upon arriving at or near the vicinity of the nanoantenna 16 (within the near field of the electromagnetic field thereof), a single particle 18 may be trapped within a plasmonic hotspot generated by the illuminated nanoantenna 16. As used herein, a plasmonic hotspot is a region having a high local electromagnetic field relative to surrounding regions which creates a plasmonic trapping site (plasmonic trapping potential well) capable of trapping a particle 18. The trapped particle 18 may then be individually analyzed and/or manipulated.

Figure 2:
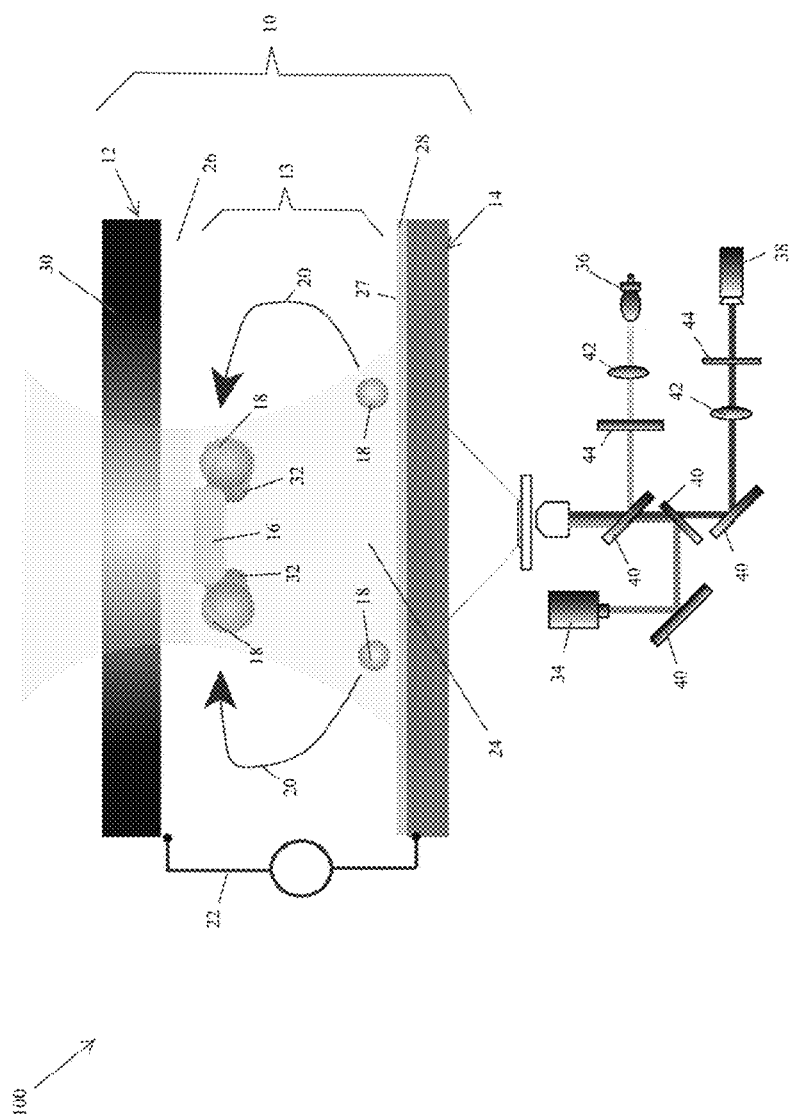
FIG. 2 schematically represents a system comprising a HENT device according to a second nonlimiting embodiment of the invention.

The HENT device 10 may comprise various layers and materials. For example, FIG. 2 represents a nonlimiting embodiment of a system 100 comprising a HENT device 10. In this embodiment, the first substrate 12 comprises a first conductive layer 26 in contact with the fluid medium and has a nanoantenna 16 located directly on the first conductive layer 26. The second substrate 14 comprises an electrically conductive surface 27 or a second conductive layer 28. The first conductive layer 26 and the conductive surface 27 (or second conductive layer 28) are coupled to a power source (not shown) with the electrical connection 22. FIG. 2 further represents particles 18 individually being trapped at plasmonic hotspots 32 on the nanoantenna 16.

The nanoantenna 16 can be of any suitable shape or size. As a nonlimiting example, the nanoantenna 16 can have a rectangular cross section with a length and a width ranging from 20 nm to 500 nm each. These ranges for the length and the width can be broader, such as 5 nm to 10 μm, especially if the intention is to shift the resonance to a spectral region at a longer wavelength. As another nonlimiting example, the nanoantenna 16 can have a circular cross section with a diameter ranging from 5 nm to 1 μm. Other cross section shapes include bow-ties, ellipticals, etc. with corresponding dimensions as described above. The nanoantennas 16 could also be made of nanoholes formed in a metal film. The nanoantenna 16 may be formed of any suitable electrically and/or thermally conductive material, such as but not limited to gold, silver, titanium nitride, zirconium nitride, indium tin oxide, zinc oxide, aluminum-doped zinc oxide, or a combination thereof. Alternatively, the nanoantenna 16 may be a two-dimensional structure formed of a material such as but not limited to graphene or molybdenum disulfide.

Conductive layers of the first and second substrates 12 and 14, such as the first and second conductive layers 26 and 28, may each be formed of any suitable electrically and/or thermally conductive material, such as but not limited to gold, silver, titanium nitride, zirconium nitride, indium tin oxide, zinc oxide, aluminum-doped zinc oxide, or a combination thereof. Remaining portions 30 of the first and second substrates 12 and 14 may include one or more additional layers. For example, the remaining portions 30 may be formed of a single layer of dielectric material, such as but not limited to a glass, silicon nitride, silicon, alumina, aluminum scandium nitride, titanium oxide, magnesium oxide, or a combination thereof.

Figure 3:
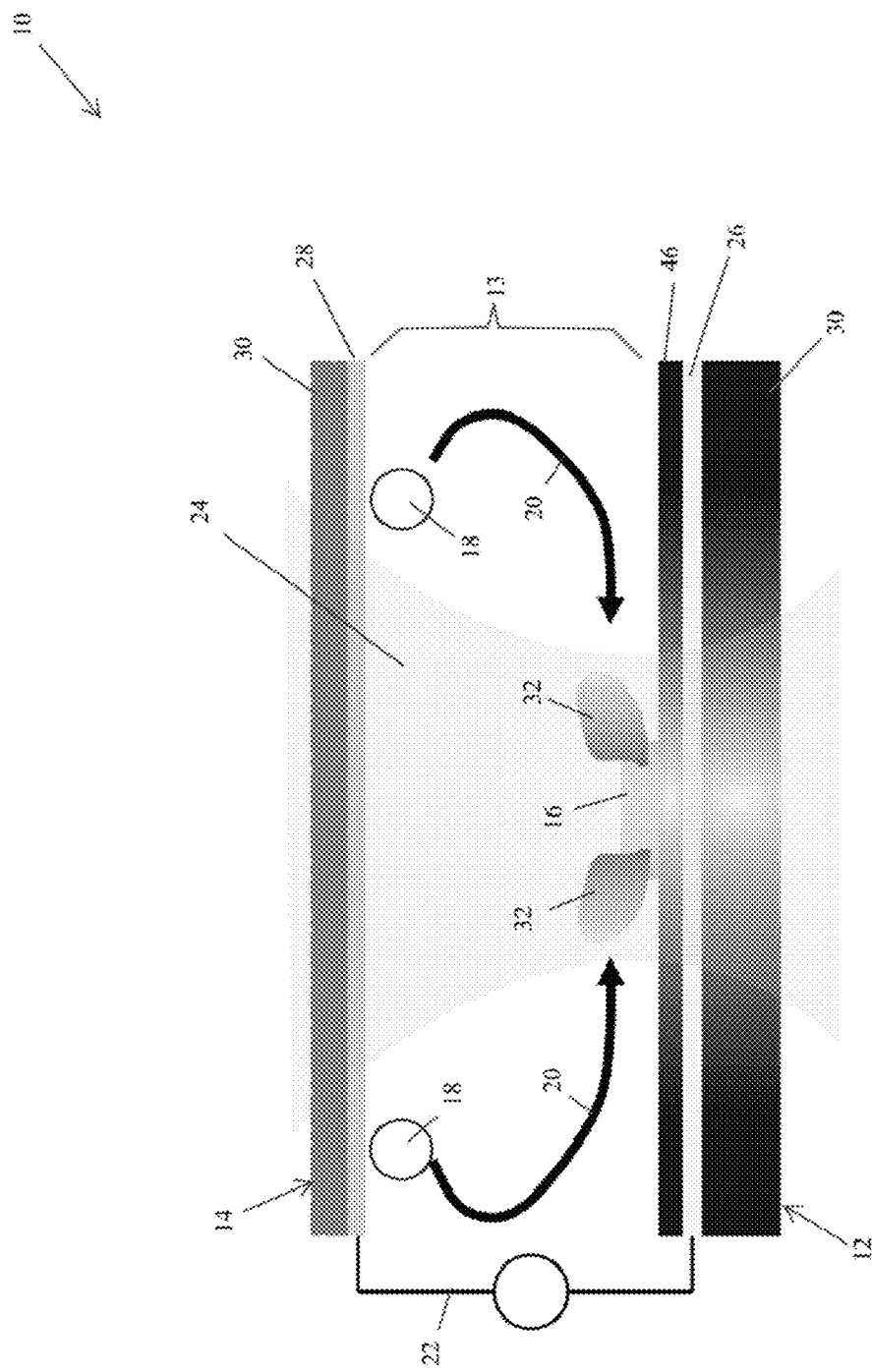
FIG. 3 schematically represents a nonlimiting HENT device comprising an insulating layer between a conductive layer and a plasmonic nanoantenna.

FIG. 3 represents a nonlimiting embodiment of a HENT device 10 comprising an insulating layer 46 between the first conductive layer 26 and the nanoantenna 16. The insulating layer 46 preferably reduces or eliminates damping of the plasmon resonance and promotes a high local field enhancement for trapping very small particles 18. The insulating layer 46 may be formed of a dielectric material, such as but not limited to a glass, silicon nitride, silicon, alumina, aluminum scandium nitride, titanium oxide, magnesium oxide, or a combination thereof.

Figure 4:
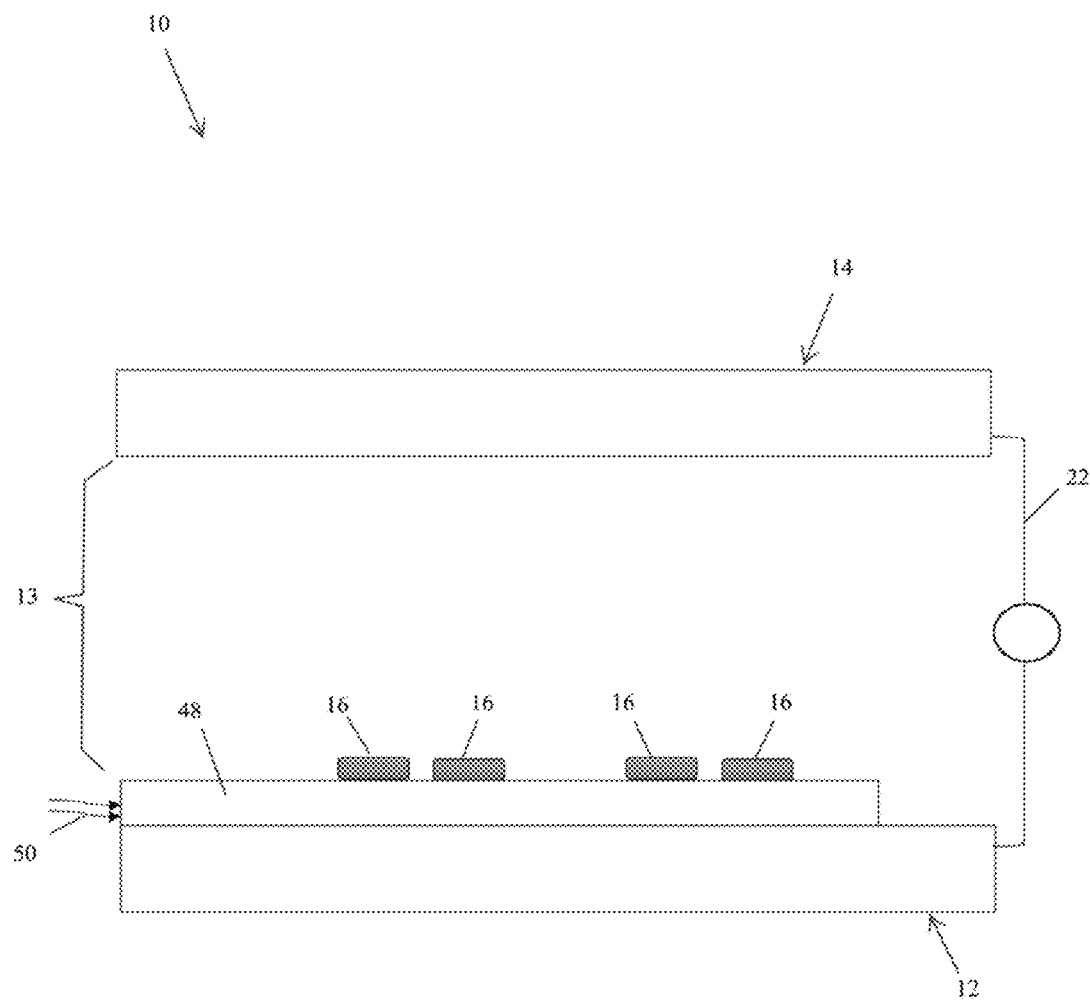
FIG. 4 schematically represents a nonlimiting HENT device comprising a nanoantenna located on a waveguide.

In order to illuminate the nanoantenna 16, FIGS. 1 through 3 represent an excitation beam 24 (for example, a laser beam) as being directed through the second substrate 14 towards the nanoantenna 16. To this end, the second substrate 14 may be formed of transparent or sufficiently transparent materials. The excitation beam 24 could be by normal incidence or by evanescent wave excitation based on Total Internal Reflection using a waveguide or prism. FIG. 4 represents a nonlimiting embodiment of a HENT device 10 that represents the nanoantenna 16 as being located on a waveguide 48 wherein particles 18 may be rapidly delivered and trapped in the trapping sites formed by the hotspots 32 produced by the nanoantennas 16 on the waveguide 48. FIG. 4 represents two pairs of nanoantennas 16 with each of the pairs being separated by a distance sufficient such that they may form separate ETP flow systems. In this arrangement, all the antennas 16 on the waveguide 48 may be excited simultaneously and several microscale vortices can be generated at the locations of the antennas 16 when the AC field is applied. The pairs of antennas 16 define a dimer system, i.e. the nanoantennas 16 within each pair are closely spaced, for example, about 2 nm to 100 nm. This type of dimer antenna promotes enhanced light field in the gap separating the two nanoantennas 16 within each pair. It will be understood that all but one of the nanoantennas 16 may be eliminated such that only a single nanoantenna 16 is located on the waveguide 48.

Figure 5:
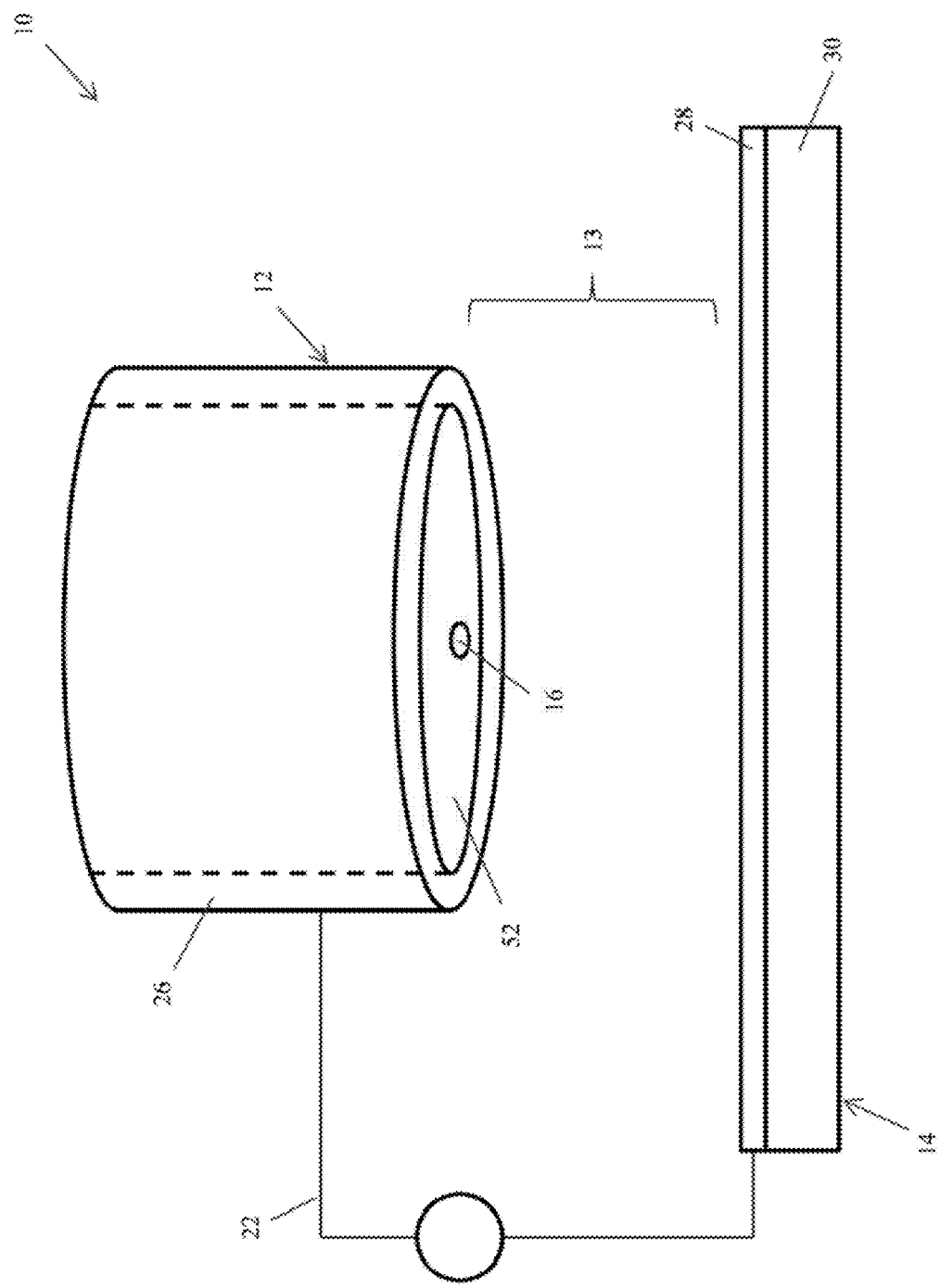
FIG. 5 schematically represents a nonlimiting HENT device comprising a nanoantenna on a tip of a fiber.

FIG. 5 represents a nonlimiting embodiment of a HENT device 10 that comprises the nanoantenna 16 as being located on a tip 52 of an optical fiber. In this instance, the fiber and any layers thereon may be considered the first substrate 12. In FIG. 5, the fiber includes the first conductive layer 26 on an exterior thereof. The excitation beam 24 may be directed through the fiber to illuminate the nanoantenna 16 at the tip 52 of the fiber.

The nanoantenna 16 is preferably illuminated with light at a near-resonance wavelength such that strong light coupling occurs resulting in a highly localized and enhanced electromagnetic field in the vicinity of the nanoantenna 16. This highly localized field enhancement, that is, a hotspot 32, produces a trapping potential site for stable trapping of suspended particles 18 that enter the trapping site. Simultaneously, the intrinsic localized heating of the nanoantenna 16 in conjunction with the applied AC electric field induces fluid flow sufficient to promote rapid (micrometer per second) delivery of particles 18 to the trapping sites. The localized heating of the fluid medium by the illuminated nanoantenna 16 creates a local gradient in the electrical properties of the fluid medium. The inhomogeneities in the fluid medium's permittivity and electrical conductivity necessitate the presence of a local net volume charge distribution to ensure that both Gauss' law and charge conservation equation are simultaneously satisfied. With an applied AC electric field, ETP flow is induced, which enables delivery of particles to the hotspot 32.

For an electrically linear, incompressible fluid, the application of an AC electric field produces an electrical body force per unit volume in the fluid medium given by:

$$f = \rho_f E_l - \frac{1}{2}|E_l|^2 \nabla \varepsilon_m$$

where $E_1$ is the local electric field, $\rho_f$ is the volume density of free charges, and $\varepsilon_m$ is the permittivity of the fluid medium. The term electrically linear refers to a fluid for which the electric susceptibility is linear. The motion of the charges results in fluid flow that in turn drags suspended particles 18 towards the hotspot 32, where the particles 18 may be trapped. Since this ETP flow requires not only illumination, but the presence of applied AC field, fluidic motion and hence particle transport can be generated on-demand by activating the AC field, and this provides a means to selectively applying plasmonic trapping force and fluidic drag. That is, the AC field may be activated while the nanoantenna 16 is simultaneously being illuminated in order to transport a particle 18 to the hotspot 32. The AC field may then be deactivated thereby reducing fluid flow, and the particle 18 will remain trapped by the optical gradient force induced by the enhanced local field in the vicinity of the illuminated nanoantenna 16.

It is believed that such on-demand fluid motion cannot be achieved by simultaneously illuminating arrays of closely spaced nanoantennas 16 due to intrinsic thermoplasmonic convection. According to the Boussinesq approximation, the buoyancy-driven convection force density is given by:

$$F = g\rho_0\beta(T)[T(r)-T_0]$$

wherein $\rho_0$ and $\beta(T)$ are the density and thermal expansion coefficient of the fluid medium, respectively. This represents the residual intrinsic thermoplasmonic convection caused by the photo-induced heating of an array of nanoantennas 16 and for $\beta(T)\neq 0$, its reduction/elimination would necessitate microgravity conditions ($g\rightarrow 0$) currently believed to be only achievable in outer space. However, by employing the photo-induced heating of only a single or a few nanoantennas 16, the microgravity conditions are unnecessary, since intrinsic thermoplasmonic convection by a single nanoantenna 16 is extremely weak (<10 nm/s).

Figure 6:
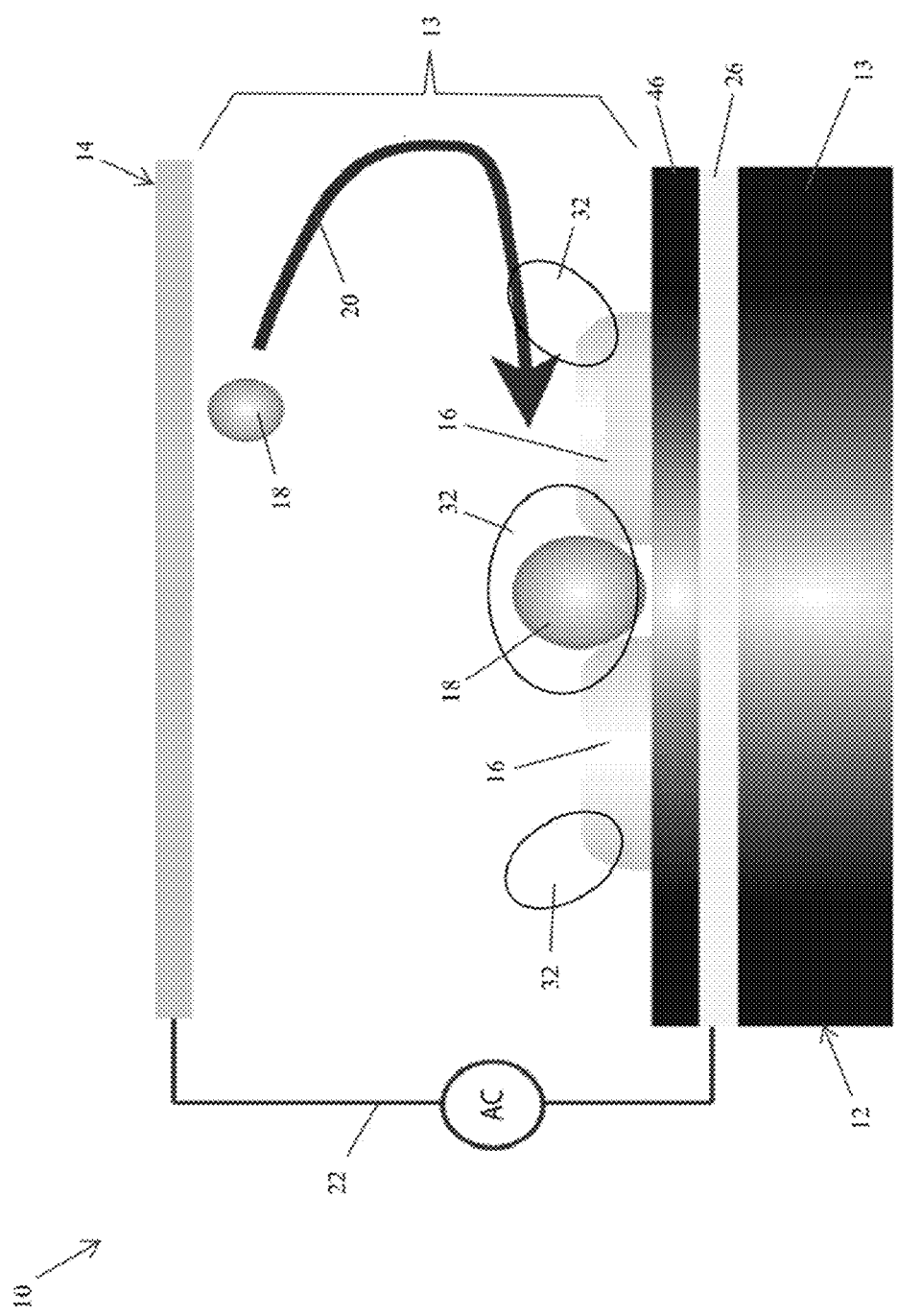
FIG. 6 schematically represents a nonlimiting HENT device comprising two adjacent nanoantennas.

For example, FIG. 6 represents a nonlimiting HENT device 10 comprising a pair of closely spaced (about 2 nm to 100 nm side-to-side) nanoantennas 16 that collectively define a dimmer antenna. Upon illumination of the dimmer antenna, each nanoantenna 16 forms two hotspots 32, and the pair of hotspots 32 between the nanoantennas 16 effectively combine to promote an enhanced light field in the gap separating the two nanoantennas 16. The intensity of this local field in the gap is higher than the intensity of the hotspots 32 on the other ends of the nanoantennas 16. While the exact number of closely spaced nanoantennas 16 that may be simultaneously illuminated with be dependent on the specific parameters of the system, it is believed that increasing the number of closely space nanoantennas 16 that are simultaneously illuminated increases the thermoplasmonic convection of the local system, and on-demand fluid motion will likely no longer be achieved when the number of nanoantennas 16 in the array at the given illumination intensity is such that the thermoplasmonic convection velocity induced is large enough to induce a net motion of the suspended particles in excess of their intrinsic random Brownian motion.

The HENT devices 10 may be capable of sorting the particles 18 and selectively delivering the particles 18 to the hotspots 32. For example, if there are two sizes of particles 18 in the fluid medium, either of the sizes of the particles 18 may be selected and delivered to the hotspots 32. To accomplish this task, the AC field may be tuned to selectively deliver particles 18 of only the smaller size to the hotspots 32 where they will be trapped. In order to trap the larger sized particles 18 at the hotspots 32, the AC field may be tuned to capture both of the sizes of the particles 18. However, the larger sized particles 18 would experience a larger amount of hydrodynamic drag, preferentially occupy the portion of the fluid medium within the vortex of the ETP flow, and hence be significantly more likely to enter the trapping potential site at the hotspots 32. When the AC field is subsequently deactivated, the particles 18 will remain trapped at the hotspots 32. This technique can be applied when there are more than two different sizes of particles 18 in the fluid medium that need to be sorted.

Once a particle 18 is trapped in a hotspot 32, the particle 18 may be analyzed with various processes. For example, the particle 18 may be observed with an optical imaging device, such as a scanning electron microscope (SEM) or a dark field microscope, with a spectroscopy technique such as Raman spectroscopy, and/or the particle 18 may be sensed by monitoring shifts in the resonance spectrum of the nanoantenna 16 (such as a shift in the wavelength of maximum scattering or absorption). Consequently, the disclosed systems and methods promote analysis of particles 18 for a variety of techniques.

Once an individual particle 18 is trapped within a hotspot 32 and the AC field has been deactivated, the particle 18 may optionally be printed, that is, physically fixed in place. Such printing may be performed by applying a DC electric field or, alternatively, an AC electric field at a very low frequency. The DC (or low frequency AC) electric field exerts an electrophoretic force on the trapped particle 18, which forces the particle 18 closer to the surface of the nanoantenna 16. As the particle 18 gets closer to the surface, short range interactions such as van der Waal forces act on the particle 18 to fix it in place on the surface. A nonlimiting example of a low frequency AC electric field for printing a particle 18 is a frequency of about 5 Hz or below. If the AC electric field has a frequency above about 5 Hz, the particle 18 may remain trapped in the hotspot 32 as the forces on the particle 18 are generally quickly changing direction in each cycle and not allowing sufficient time for the particle 18 to get close enough to the surface where van der Waal interactions can act on the particle 18. If the applied AC electric field has a frequency that is too high (and depending on Clausius Mossoti factor of the particle-fluid system), it is possible that a negative dielectrophoretic force may act on the particle 18 which repels the particle 18 from the nanoantenna 16 and precludes trapping of the particle 18.

After the printing process is complete, both the optical excitation and the DC field (or AC field with very low frequency) can be removed or deactivated with the particle remaining in place. Thus, this printing functionality saves power relative to conventional systems as it is no longer necessary for the light source to be illuminating the nanoantenna 16 to keep the particle 18 in place. Other particles 18 or nanomaterials could also be delivered close to the nanoantenna 16 by repeating the steps above and printed close to the previously printed particle 18 to assemble a complex system. For example, it is foreseeable that the polarization of the illuminating light source could be rotated to rotate the hotspots 32 (or trapping sites) and trap the particles 18 at those new locations.

Experiments leading to the present invention utilized a system and HENT device of the type schematically represented in FIG. 2. The nanoantenna 16 of the HENT device 10 was formed of gold and had a diameter of 320 nm and a thickness of 130 nm. The nanoantenna 16 was located directly on a first conductive layer 26 which was formed of a gold film having thickness of 140 nm. The first conductive layer 26 was located on a glass substrate 30 for structural support. The nanoantenna 16 was in contact with a fluid medium containing suspended particles 18 having a maximum dimension of about 300 nm. The fluid medium was confined in the channel 13 between the first conductive layer 26 and a second substrate 14 comprising a second conductive layer 28.

The system 100 included excitation and imaging devices that included a 15 mW laser 34 capable of producing a laser beam 24 for illuminating the nanoantenna 16, and a light source 36 and a camera 38 for imaging particles 18 trapped in hotspots 32 near the nanoantenna 16 (40 were mirrors, 42 were focusing lenses, and 44 were bandpass filters). During the experiments, the laser 34 was operating at a wavelength of 1064 nm and focused to a spot diameter of 1 μm.

Nonlimiting embodiments of the invention will now be described in reference to experimental investigations leading up to the invention using the system 100 of FIG. 2.

Figure 16:
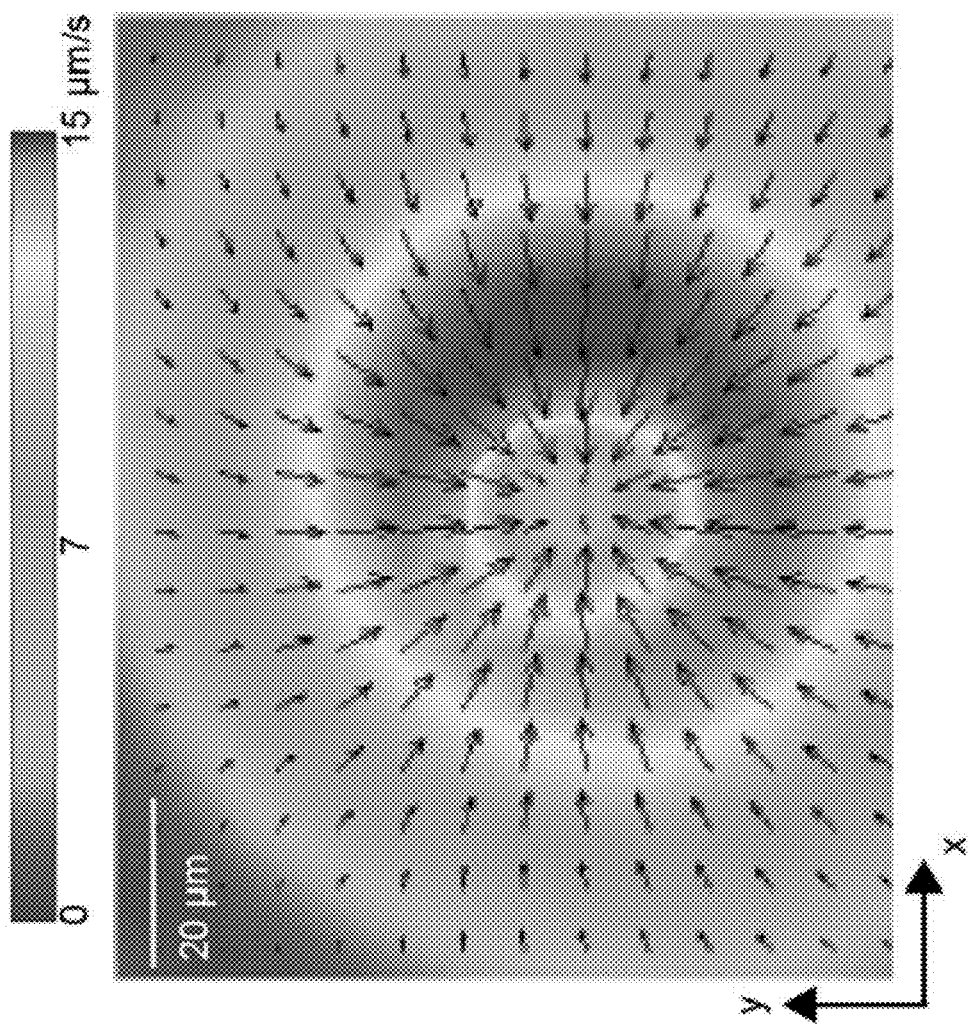
FIG. 16 is an image that represents experimentally measured radial velocity vectors for electrothermalplasmonic flow induced around an illuminated nanoantenna.

Experimental demonstration of trapping in the HENT-based system 100 of FIG. 2 was performed using 300 nm polystyrene particles 18 within the fluid medium. Although the system 100 was capable of trapping smaller particles 18, this particular size was used for ease of visualization of the trapping dynamics. The same nanoantennas 16 used for the description of electrothermoplasmonic flow were also used for the trapping experiments under similar illumination conditions. Initially, the nanoantenna 16 was excited with the 1064 nm laser beam 24. Under this condition, the intrinsic thermoplasmonic convection was extremely weak and except for random Brownian motion, no net particle flux was observed. An AC field of 80,000 V/m at 50 KHz was then applied, which immediately resulted in the creation of electrothermoplasmonic flow. The radial component of the electrothermoplasmonic flow was directed towards the thermal hotspot 32 of the illuminated nanoantenna 16 and facilitated well-directed delivery of the suspended particles 18 to the hotspots 32. FIG. 16 represents the experimentally measured radial velocity vectors for ETP flow induced around the illuminated nanoantenna 16.

Figure 17:
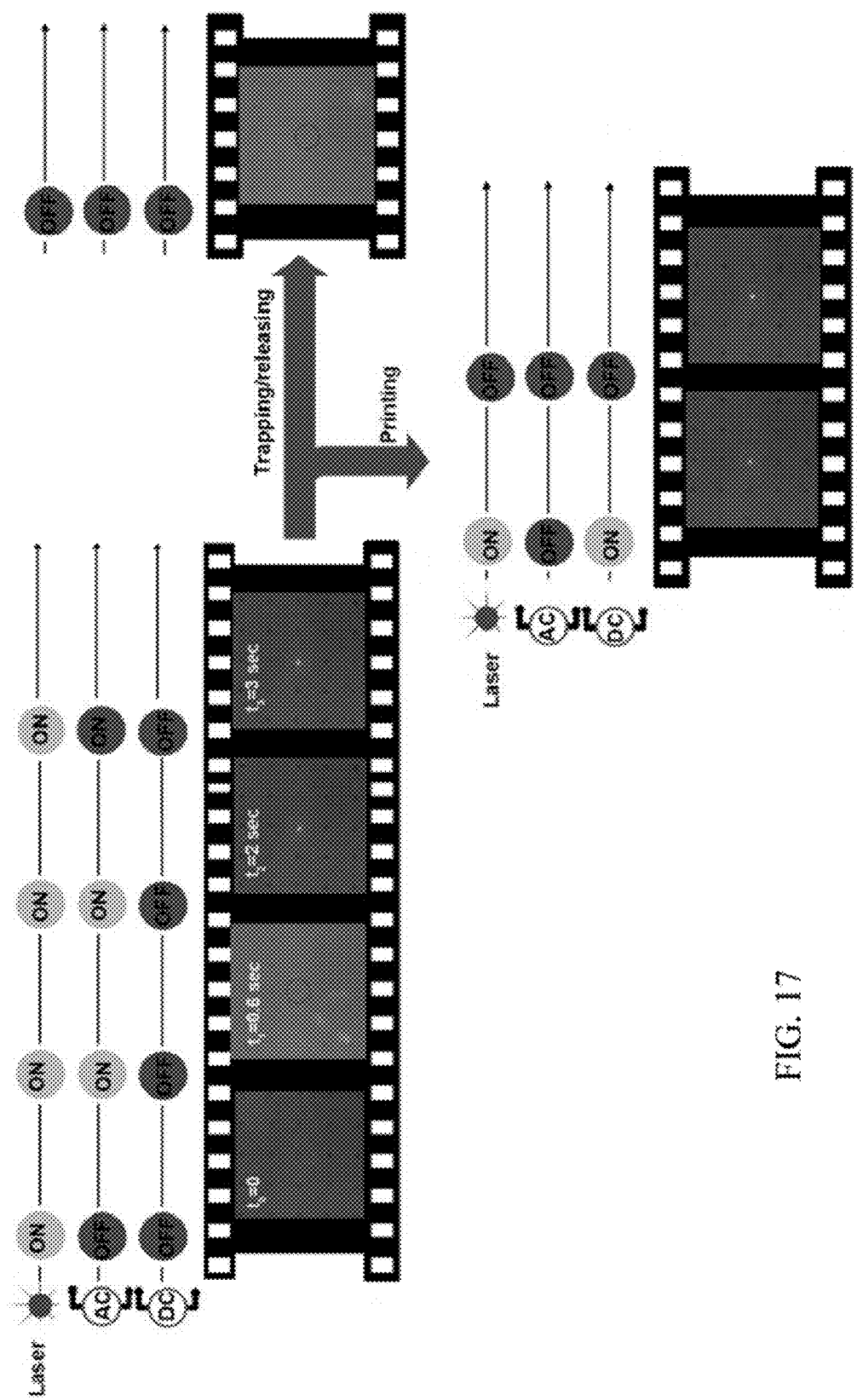
FIG. 17 schematically represents a sequence of transport, trapping, releasing, and printing of a 300 nm polystyrene nanoparticle.

Particle trapping and printing results are shown in FIG. 17 which depicts a sequence of particle delivery by ETP flow to an illuminated nanoantenna 16 for trapping at the addressable hotspots 32. At the starting point ($t_0$=0), only the laser 34 was activated to illuminate a specific nanoantenna 16 (marked by a circle) and particles 18 were only undergoing Brownian motion. At $t_1$, the AC field was applied to induce ETP flow for rapid delivery of particles 18 to the hotspot 32. A fast motion of particles 18 was observed towards the nanoantenna 16. At $t_2$, a particle 18 had been delivered and captured at the hotspot 32 in less than two seconds. When the AC field was deactivated at $t_3$, with the laser 34 still activated, the particle 18 remained trapped by optical gradient forces. When a DC field (or AC field with very low frequency) was applied while the laser 34 was still activated, the particle 18 was permanently printed at the location of the hotspot 32. The system 100 was used to individually print an array of particles 18 to form the shape of the letter "P" as represented in the last image.

The physics of the ETP flow mechanism was described by several coupled partial differential equations, which were solved numerically using the Comsol Multiphysics® software package. First, the wave equation was solved for the electric field E around the nanoantenna 16:

$$\nabla \times \nabla \times E - k_0^2 \in (r) E = 0 \quad (1)$$

where $k_0 = 2\pi/\lambda$, with $\lambda$ being the free space wavelength, and $\in(r) = \in'(r) - i\in''(r)$ being the complex dielectric permittivity. The computed electric field distribution was used to determine the heat source density, which gave the heat dissipated per unit volume:

$$q(r) = \frac{1}{2} Re[J \cdot E]^{21}$$

with J being the induced current density in the nanoantenna 16. The heat source density served as the source term in the heat diffusion equation for computation of the temperature on the nanoantenna surface as well as in the surrounding portions of the fluid medium and the first substrate 12. The temperature field in the system 100 was determined by solving the steady state heat equation given by:

$$\nabla \cdot [\kappa \nabla T(r) + \rho c_p T(r) u(r)] = q(r) \quad (2)$$

with $\kappa \nabla T(r)$) being the heat conduction term, and $\rho c_p T(r) u(r)$ being the convection term, which depends on the velocity of the fluid. T(r) and u(r) are spatial temperature and fluid velocity field respectively, and the material properties $\kappa$, $\rho$, and $c_p$ depict thermal conductivity, density, and specific heat capacity, respectively.

The velocity field distribution is determined from the solution of the incompressible Navier-Stokes equation given by:

$$\rho_0 = (u(r) \cdot \nabla) u(r) + \nabla p(r) - \eta \nabla^2 u(r) = F \quad (3)$$

with $\nabla \cdot u = 0$

The forcing term F describes the force per unit volume acting on the fluid medium. Thermoplasmonic convection may be described by convective fluid transport, for which the Boussinesq approximation was employed for buoyancy-driven natural convection given by:

$$F_{buoy} = g\rho_0 \beta(T)[T(r) - T_0] \quad (4)$$

where g, $\rho_0$, $\beta(T)$ are the gravitational constant, density of water, and thermal expansion coefficient of water, respectively (assuming the fluid medium is water). To model the proposed ETP flow, the electrical body force term was added, which is triggered by applying an AC electric field to the environment of the illuminated nanoantenna, as an additional forcing term. Following a perturbative expansion, the time-averaged electrical body force per unit volume at frequency $\omega$ can be expressed as:

$$\langle F_{ETH} \rangle = \frac{1}{2} \varepsilon \left[ \frac{(\alpha - \gamma)}{1 + (\omega \tau)^2} (\nabla T \cdot E) E - \frac{1}{2} \alpha |E|^2 \nabla T \right] \quad (5)$$

For convenience, this can be expanded into the axial (z direction) and radial (r direction) components as given below.

$$\langle F_{ETH} \rangle \hat{z} = \frac{1}{2} \varepsilon E_z^2 \left[ \frac{\sigma^2 \varepsilon (\alpha - \gamma)}{\sigma^2 + \omega^2 \varepsilon^2} - \frac{1}{2} \alpha \right] \frac{\partial T}{\partial z} \hat{z} \quad (6)$$

$$\langle F_{ETH} \rangle \hat{r} = -\frac{1}{4} \varepsilon \alpha E_z^2 \frac{\partial T}{\partial r} \hat{r} \quad (7)$$

The total force per unit volume F acting in the fluid medium in equation (3) is the combination of the buoyancy force density in equation (4) and the time averaged electrical body force in equation (5). The expressions $\alpha = (1/\in)(\partial \in /\partial T)$, and $\gamma = (1/\sigma)(\partial \sigma /\partial T)$ are given as $-0.004 K^{-1}$ and $0.02 K^{-1}$, respectively. The electrothermal body force per unit volume is composed of two parts, the first term being the Coulomb force, while the second term is the dielectric force. Both forces oppose each other with the Coulomb force being higher at low frequencies. This additional forcing term is dependent on the square of the applied AC electric field and can be much larger than the buoyancy force that causes convection depending on the magnitude of the applied AC electric field.

Figure 7:
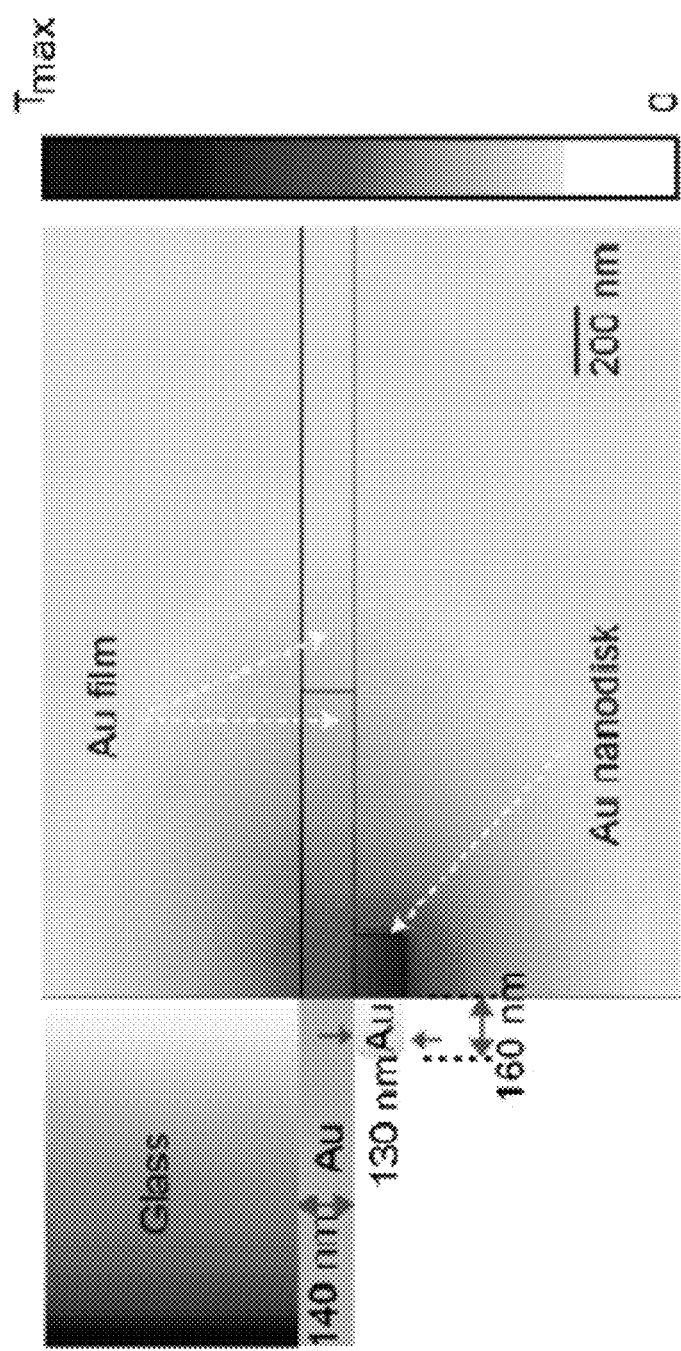
FIG. 7 represents a temperature distribution of a nanoantenna during illumination.
Figure 8:
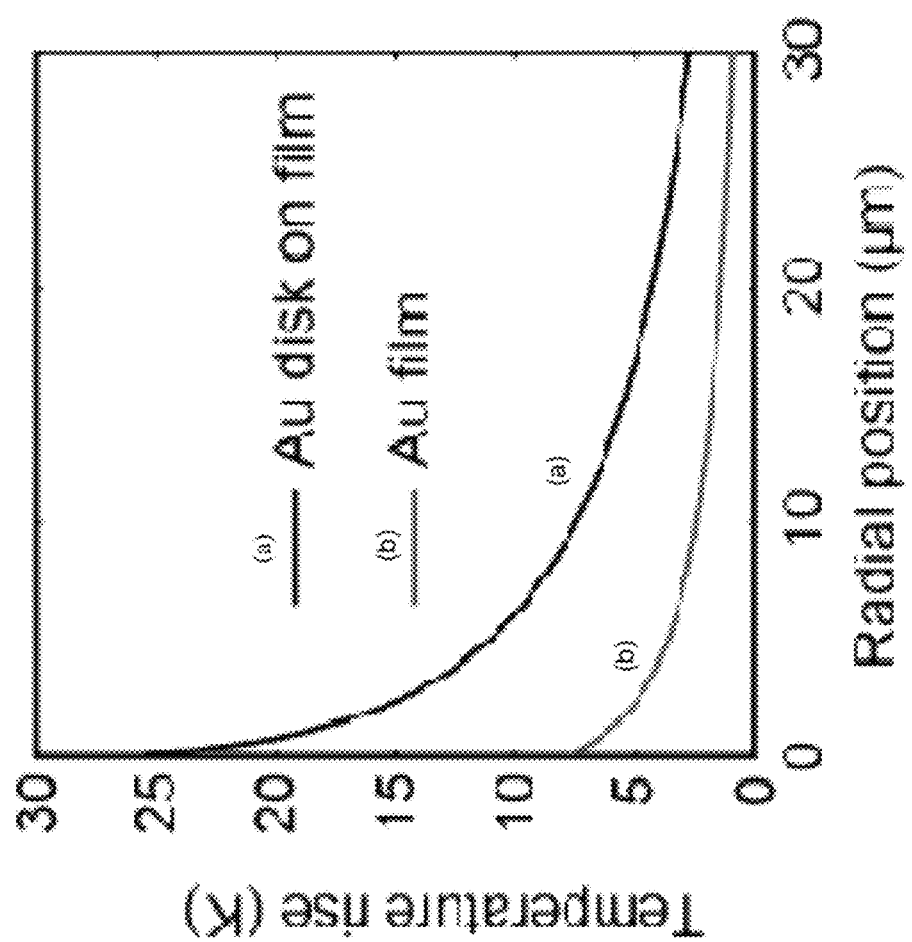
FIG. 8 is a graph that represents a temperature rise in a fluid medium near a surface of a nanoantenna for the system of FIG. 2 and a test system.
Figure 9:
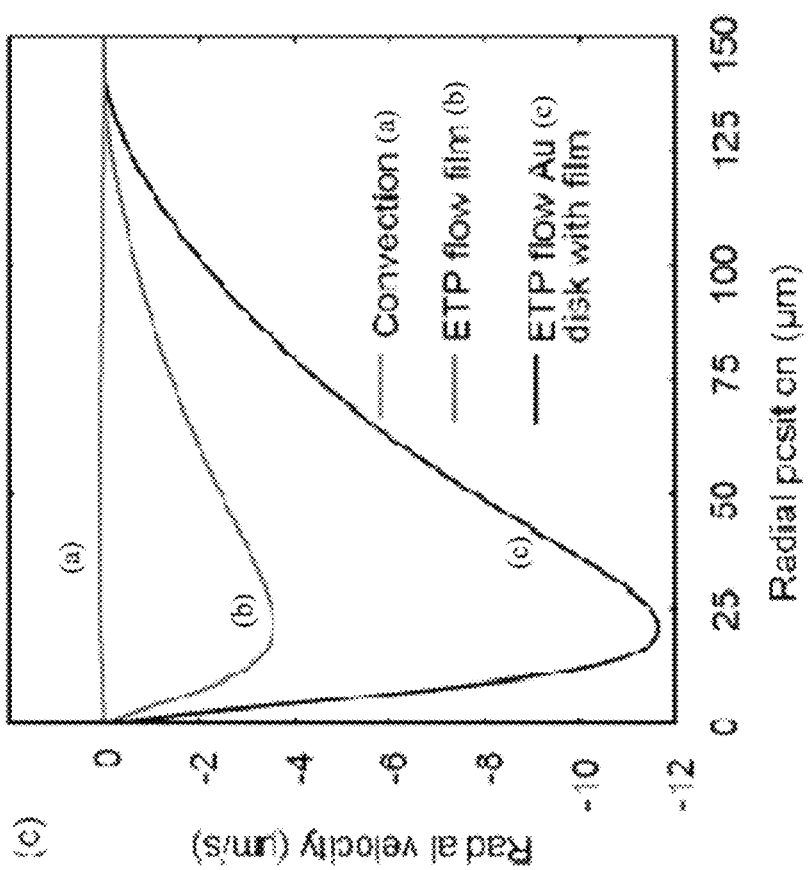
FIG. 9 is a graph that represents radial velocity resulting from electrothermalplasmonic flow and thermoplasmonic convention near a nanoantenna.

FIG. 7 represents a temperature distribution of the nanoantenna 16 during illumination. The position of the thermal hotspot 32 was clearly concentrated within the nanoantenna 16. FIG. 8 shows the temperature rise in the fluid medium at a distance of 250 nm from the surface of the nanoantenna 16 for the system 100 and a gold film-only test system that had a similar structure as the system 100 but without the nanoantenna 16 (that is, the conductive layer 26 was directly illuminated. The result clearly showed that the bulk of the fluid medium heating comes from heat dissipated in the nanoantenna 16, which was a better absorber of light than the highly reflective gold film at the illumination wavelength. The ETP flow was measured experimentally using a technique known as micro-particle image velocimetry (micro-PIV) under similar excitation conditions and parameters used for the numerical simulations in FIG. 9.

Figure 10:
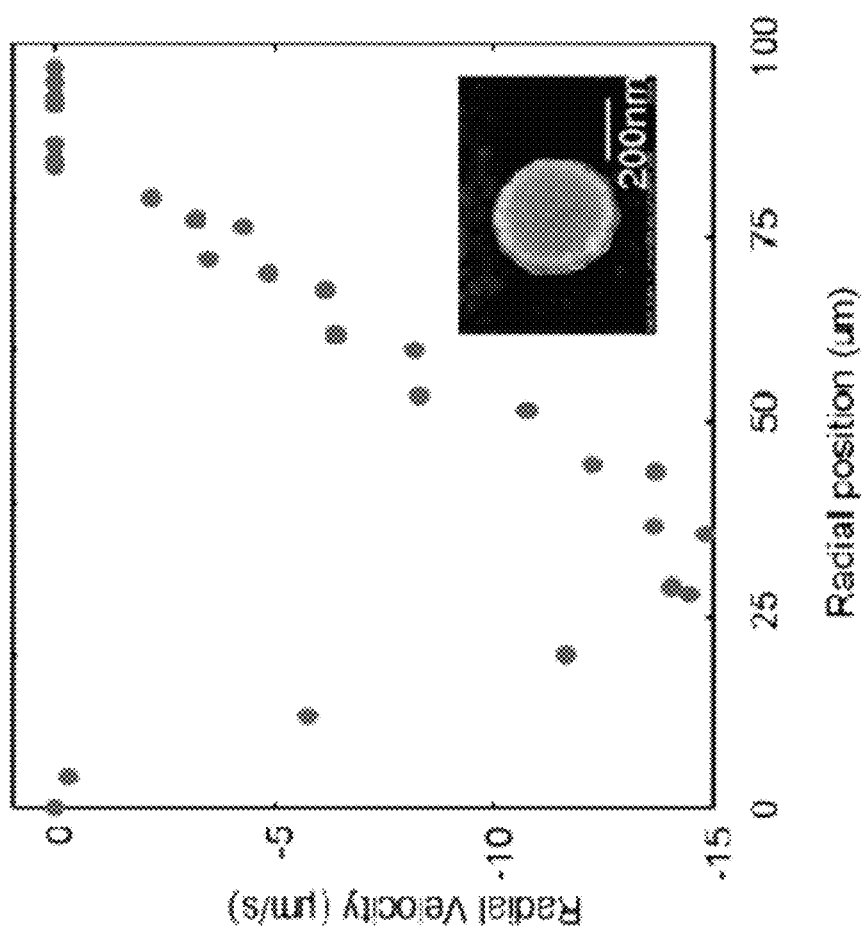
FIG. 10 is a graph that represents experimentally measured angularly-averaged radial velocity due to electrothermalplasmonic flow. The insert represents a plasmonic nanoantenna formed of gold.

The experimentally measured angularly averaged radial velocity obtained from micro-PIV analysis is shown in FIG. 10. Tracer particles of 300 nm polystyrene beads were used to visualize the flow. The measured radial velocity had a maximum of about 15 μm/s, while the theoretical result predicted a maximum velocity of 11.8 μm/s (see FIG. 9). This discrepancy was attributed to the time-averaged electrothermal body force per unit volume given in equation (5) being an approximation, which works well in the limit of low temperature gradient. As predicted theoretically, in the thermoplasmonic convection mode (without the AC electric field) no net motion of the tracer particles was observed due to extremely weak thermoplasmonic convection. A control experiment with only an electric field applied, and no illumination of the nanoantenna 16, was conducted which yielded no observed fluid motion. This indicated that AC electrosmosis, which arises due to the interaction between applied electric field and induced free charges in the electrical double layer at a solid/fluid interface, was not the driving mechanism for the observed fluid flow.

Figure 11:
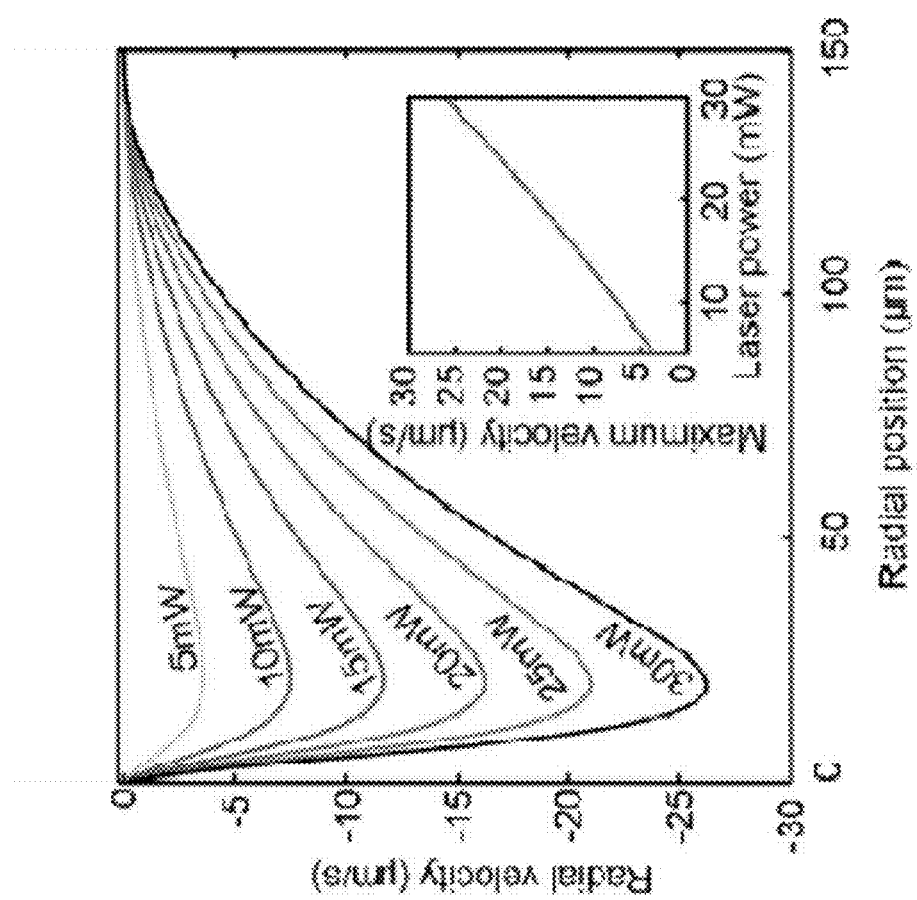
FIGS. 11 and 12 are graphs that represent scaling of radial electrothermalplasmonic flow with laser power and AC electric field strength, respectively, as obtained from numerical simulations.
Figure 12:
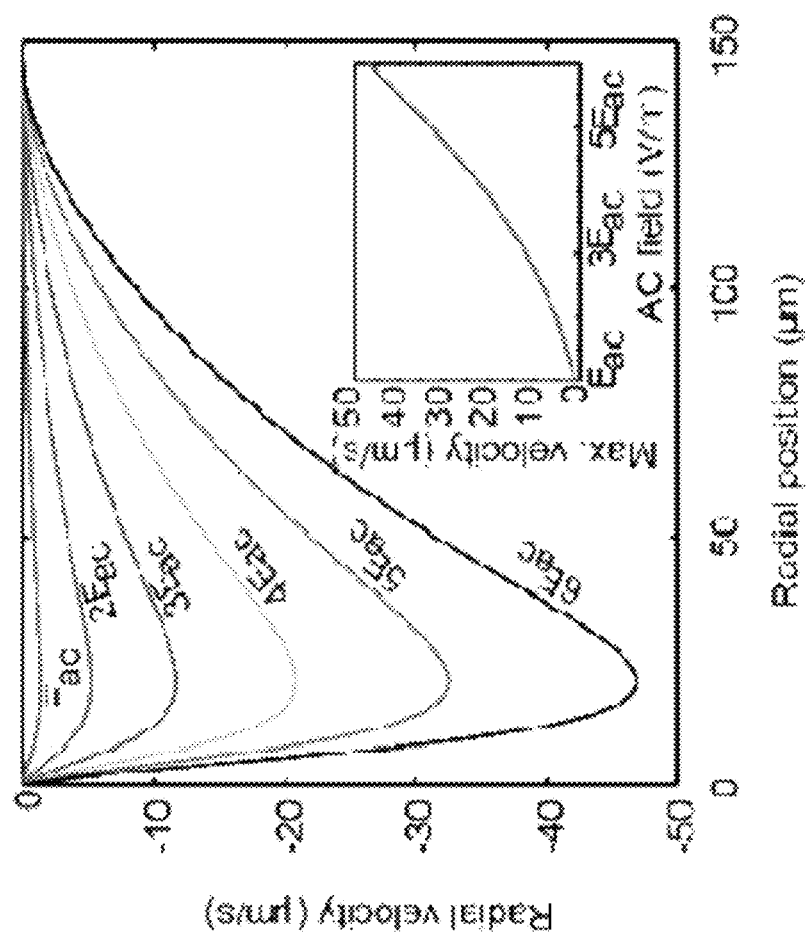

The scaling of the ETP flow with laser power and AC electric field strength as obtained from numerical simulations are shown in FIGS. 11 and 12, respectively. The analysis showed that ETP flow scales linearly with applied laser power, whereas with AC field, the scaling was quadratic. Thus, the ETP flow strength could be increased appreciably by increasing the AC field, while keeping the laser power constant especially in a fluid medium with low electrical conductivity.

As described above, the ETP flow mechanism has been demonstrated to be a powerful tool for on-demand long-range particle transport. Described below is the trapping functionality of the system of FIG. 2 represented by the short-range interaction between the excited nanoantenna 16 and the targeted particle 18.

Figure 13:
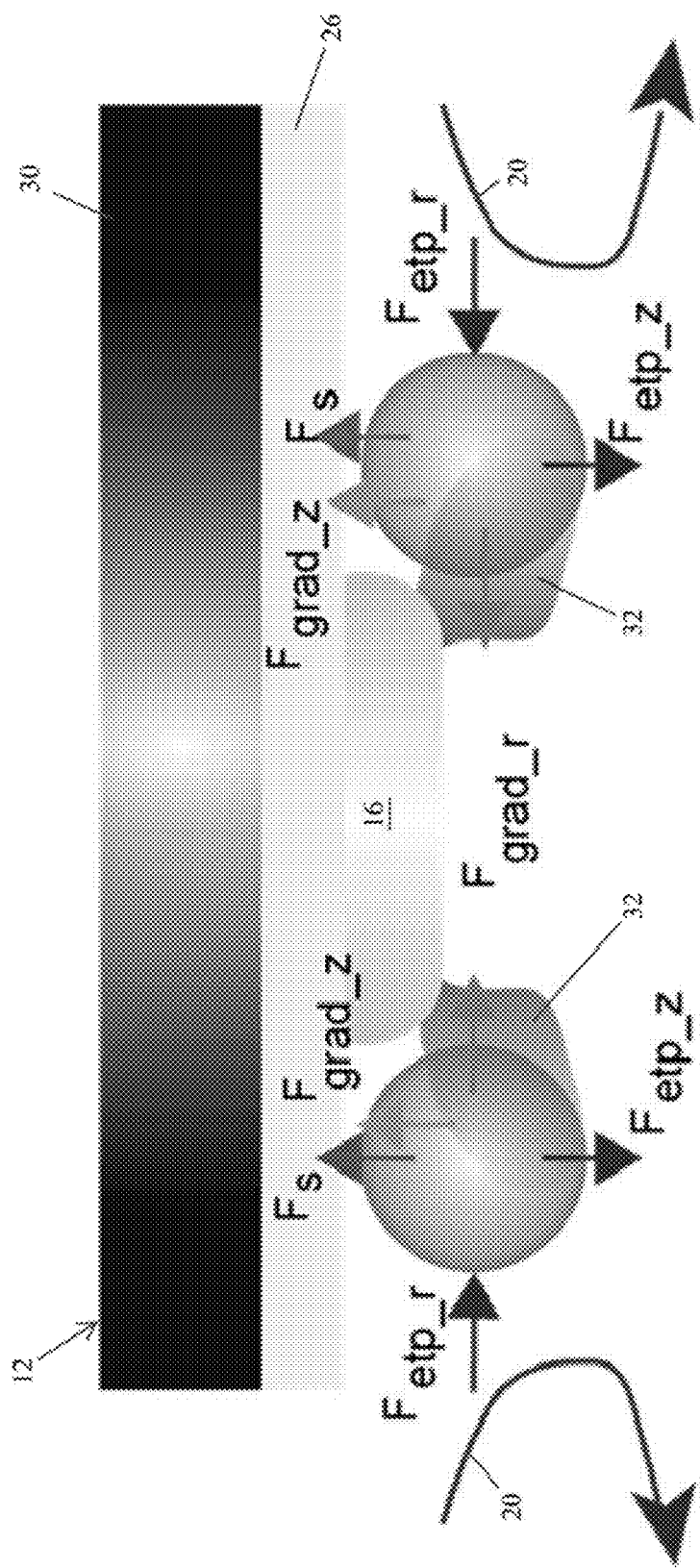
FIG. 13 represents forces acting on particles within a plasmonic hotspot when both an AC electric field and illumination are activated.
Figure 14:
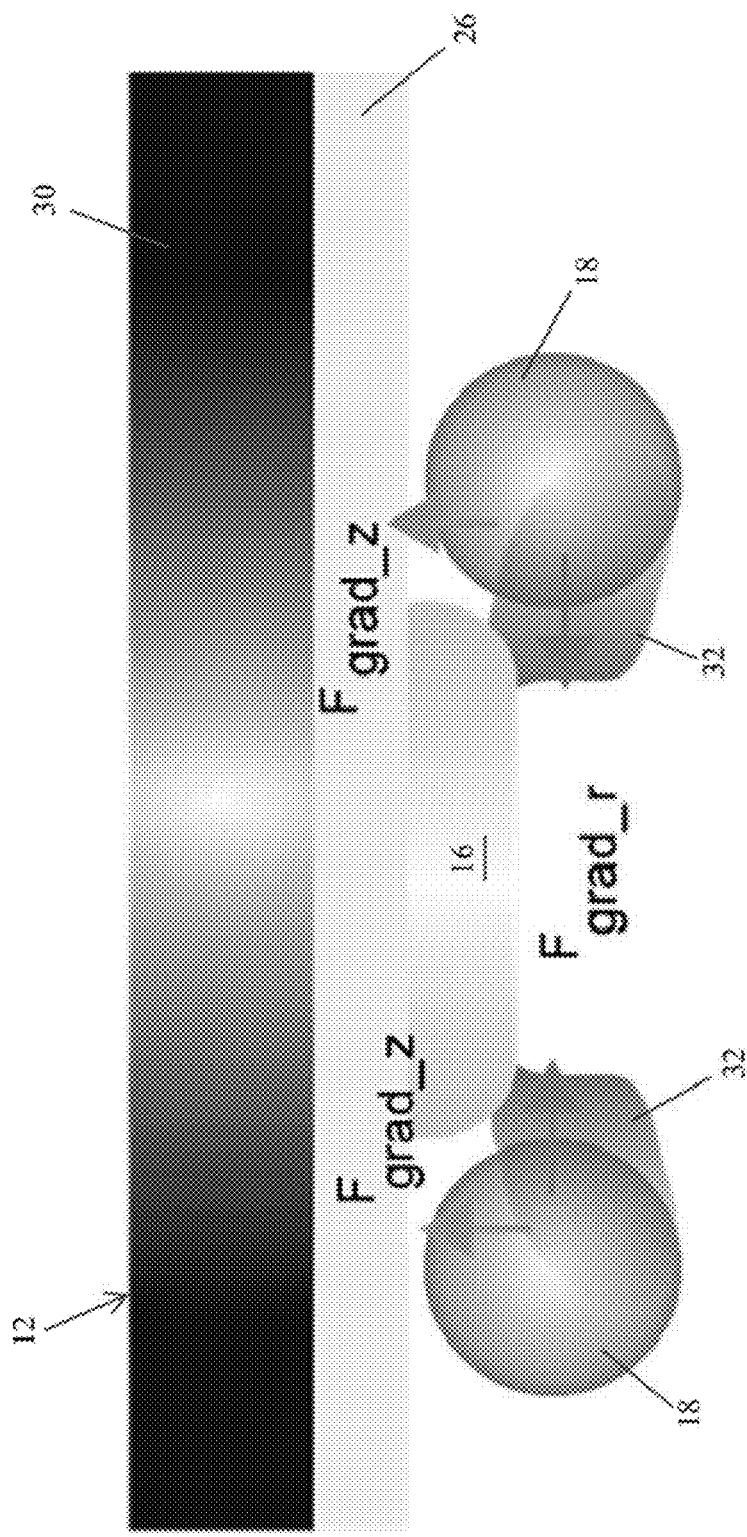
FIG. 14 schematically represents major forces acting on nanoparticles within a plasmonic hotspot when illumination was activated and the AC field was deactivated.
Figure 15:
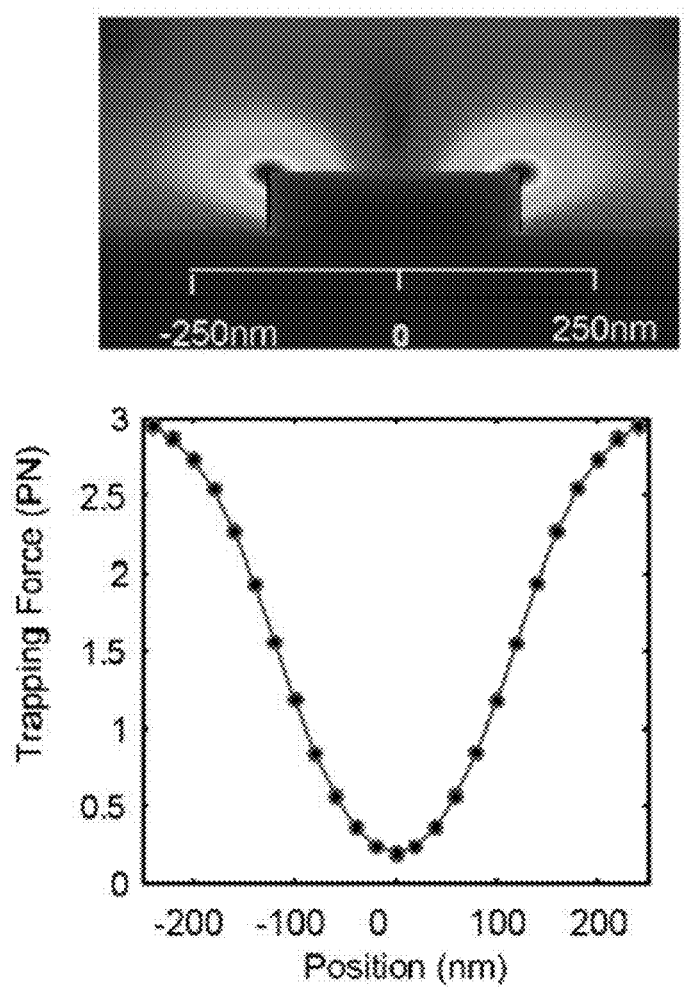
FIG. 15 contains an image and graph evidencing electromagnetic field enhancement in the vicinity of a nanoantenna.

FIG. 13 schematically represents the major forces acting on the particles 18 with both the AC electric field and illumination activated. As represented, the ETP flow was induced and it delivered the particles 18 to the hotspots 32 where the particles 18 were trapped by a balance of optical gradient, particle electrode interaction, and electrothermal drag forces. FIG. 14 schematically represents the major forces acting on the particle 18 when the illumination was activated and the AC field was deactivated. As represented, the electrokinetic forces cease, while optical gradient force in the vicinity of the nanoantenna 16 ensures stable trapping of the delivered particle 18. FIG. 15 represents an electromagnetic field enhancement in the vicinity of the nanoantenna 16. The system 100 features two hotspots 32 aligned with the direction of the polarization of the excitation beam 24. Consequently, two particles 18 can be trapped simultaneously with a single nanoantenna 16. The variation of trapping force acting on a 300 nm particle 18 was a function of lateral position. The lowest point on the particle 18 is placed about 35 nm from the surface of the nanoantenna 16. FIG. 16 represents an experimentally measured radial velocity vector plot of ETP flow induced around the nanoantenna 16. The results showed the flow directed radially inwards towards the thermal hotspot 32, and served as a powerful means to deliver suspended particles 18 to the nanoantenna 16. Although the disk-shaped nanoantenna 16 used in the investigations disclosed herein produced two hotspots 32 (separated below the diffraction limit) due to the dipolar resonance supported by the nanoantenna 16, it is foreseeable that nanoantennas 16 of other configurations my produce quadrapolar resonance at the illuminating wavelength and therefore produce four hotspots 32 (and hence four trapping sites).

When the nanoantenna 16 was illuminated with the excitation beam 24, the strong coupling with light created two hotspots 32 at the edges of the nanoantenna 16. Since the nanoantenna 16 was on a relatively thick (140 nm) gold film, the hotspots 32 resided in the fluid medium where they were accessible to the particles 18. These highly localized hotspots 32 created short range optical gradient forces close to the nanoantenna 16. The gradient force had radial and axial components depicted by $F_{gradr}$ and $F_{gradz}$, respectively. Application of the AC electric field actuated the ETP flow, which exerted drag forces on the suspended particles 18 given by $F_{etpr}$ and $F_{etpz}$ in radial and axial directions, respectively, as shown in FIG. 13. Once brought close to the nanoantenna 16, the short range optical gradient forces were exerted on the particle 18 to trap it at the location of the hotspot 32. In addition to the optical gradient force, another force, termed the particle-electrode interaction force $F_s$, was induced by the AC electric field on the particle 18 that has been brought close to the nanoantenna 16 and the first conductive layer 26. This particle-electrode interaction force is usually attributed to local AC electro-hydrodynamic flow, and has been shown to enable layering of colloidal particles and is appreciable at low AC frequencies. Under this condition, where both the illumination and AC electric field are activated, the HENT device 10 is said to be operating in a hybrid mode. If the AC field is deactivated, with the excitation beam 24 still activated (FIG. 14), the gradient force keeps the delivered particles 18 locked in place. The distribution of the gradient force computed via Maxwell's stress tensor formalism as a function of the particle's position is shown in FIG. 15. Axially, the lowest point on the particle 18 is at a separation of about 35 nm from the surface of the nanoantenna 16. It was evident that the strongest forces were at the edges of the nanoantenna 16, and two particles 18 can be preferentially trapped at these locations.

The trapping performance of the HENT devices 10 disclosed herein are fundamentally different from the results described in the article by Ndukaife, J. C. et al. titled "Photothermal heating enabled by plasmonic nanostructures for electrokinetic manipulation and sorting of particles." (ACS Nano 8, 9035-43 (2014)), the contents of which are incorporated by reference in their entirety into this disclosure. While not intending to promote any particular interpretation, the above-noted article only demonstrated agglomeration of multiple particles, as opposed to the movement, capture, and manipulation of individual particles as demonstrated in the investigations leading to the present invention.

Thus in this disclosure, it has been demonstrated both theoretically and experimentally that a single nanoantenna 16 can induce micron-scale fluidic motion based on ETP flow. Also developed in this disclosure is an original hybrid nanotweezer (HENT) that employs the ETP flow mechanism to rapidly deliver suspended particles towards addressable hotspots 32, while enabling high resolution trapping of single particles 18 in sub-wavelength plasmonic optical fields, that is, the trapping sites. It should be recognized that an element of this disclosure is an additive nanomanufacturing tool for "printing" trapped particles 18 in hotspots 32.

The HENT devices 10 may be manufactured by various methods. For example, the HENT device 10 represented in FIG. 2 was produced by depositing a 140 nm thick film of gold on a glass substrate (with a 3 nm titanium adhesion layer) using electron beam evaporation. Electron beam lithography (EBL) was then used to pattern gold nanodisks of 320 nm diameter and 5 μm period on the gold film-coated glass substrate. The gold film-coated glass substrate was subsequently spin-coated with 400 nm ZEP-520A photoresist, and baked at 180° C. for two minutes. Electron beam lithography (EBL) was again used to pattern the gold nanodisks. At the completion of EBL, the resist was developed in ZED N50 for two minutes, rinsed with isopropyl alcohol (IPA), developed again in ZED N50 for thirty seconds, and finally rinsed with IPA. A titanium film with a thickness of 3 nm was deposited thereon to serve as an adhesion layer, which was followed by deposition of 130 nm gold film in an electron beam evaporation chamber. A lift-off process was carried out by dipping the patterned substrate in ZDMAC for twenty minutes and subsequently rinsing with IPA. Other fabrication process such as laser-based machining could also be employed to produce the nanoantenna.

After the first substrate 12 has been produced, the second substrate 14 having an electrically conductive surface 27 or an electrically conductive layer 28 may be fabricated, and the first and second substrates 12 and 14 may be combined with a body therebetween comprising the channel 13 therein for the fluid medium. For the investigations described herein, the channel 13 was by perforating a double-sided scotch tape with a thickness of about ninety micrometers and placing it between the first and second substrates 12 and 14. In order to produce the electric fields, electrically conducting pads may be placed on the first and second conductive layers 26 and 28 (or surface 27) of the first and second substrates 12 and 14 in order to provide electrical connections 22 to a power source.

The approach presented in this disclosure enables implementation of a host of applications including: i) selection, manipulation, and analysis of nanoelements; ii) programmable 2D nano-printing; iii) ultra-resolved optofluidic screens; and iv) reconfigurable plasmonic circuitry for integrated quantum logic units.

An emerging paradigm in nanomanipulation is the concept of an on-chip nano-factories, whereby the trapping forces are envisioned to enable assembly and further processing of nanomaterials in an integrated device. While this is an exciting concept, it has remained to date largely unimplemented due to theoretical and technological constraints. However, the HENT devices 10 possess not only the ability to manipulate nanomaterials, but are also capable of 2D nano-printing. These capabilities may enable nanomanufacturing on-chip. By repeating the delivery, trapping, and printing processes, other particles or nanomaterials may be printed close to the previously printed particle to assemble a complex system comprising an arrangement of multiple particles 18 that are fixed in the vicinity of the nanoantenna 16. As a nonlimiting example, it is foreseeable that the HENT devices 10 may be used to produce a nanochip, that is, an integrated circuit (IC) that is so small, in physical terms, that individual particles of matter play a role in the operation of the circuit. Such nanochips could be manufactured on an individual particle basis rather than, for example, etching a pre-existing chip as performed to produce conventional ICs. Additionally, the use of spatial light modulators could enable one to excite numerous well-spaced nanoantennas 16 to achieve multiplexed manipulation of fluid motion and particles 18 at several locations in a chip.

The particles 18 may include technologically relevant objects like quantum dots and nanodiamonds hosting nitrogen vacancy centers. A specific nonlimiting example, nano-positioning of individual nitrogen/vacancy-center nanodiamonds near hotspots may enhance their emission efficiency and generate stable room temperature single photon sources, suitable for reconfigurable plasmonic circuitry for integrated quantum logic units. Based on Fermi's Golden rule, the emission rate of an emitter is proportional to the density of available states to emit into. Since the hotspots 32 are regions of high photonic density of states, placing an emitter into the hotspots 32 would likely enhance their emission and reduce their emission lifetime. These properties are very useful for realization of efficient on-demand single photon sources, which are key for future quantum technologies.

The HENT devices 10 and systems described herein solve the problem of inability to control the dynamics of suspended particles 18. In particular, the HENT devices 10 enable rapid particle delivery to the hotspot 32 on a sub-second time scale, thus essentially beating the diffusion limit, and trapping of the particles 18 on or near the nanoantenna 16. Thus, the HENT devices 10 and systems resolve a long standing issue that has so far drastically limited the performance of conventional plasmonic nanotweezers.

While the invention has been described in terms of specific embodiments, it is apparent that other forms could be adopted by one skilled in the art. For example, the physical configuration of the HENT devices 10, system 100, and their components could differ from that shown, and materials and processes/methods other than those noted could be used. Therefore, the scope of the invention is to be limited only by the following claims.

The invention claimed is:

1. A system for manipulating nanoscale particles, the system comprising:
   a fluid medium comprising the particles;
   a plasmonic nanoantenna in contact with the fluid medium;
   a source of light to illuminate the plasmonic nanoantenna and excite localized surface plasmons in the vicinity of the plasmonic nanoantenna; and
   means for applying an alternating current electric field in the fluid medium;
   wherein simultaneous illumination of the plasmonic nanoantenna and application of the electric field causes electrothermoplasmonic flow in the fluid medium that transports at least one of the particles towards the plasmonic nanoantenna and the at least one particle is trapped by optical gradient forces in the vicinity of the plasmonic nanoantenna.

2. The system of claim 1, wherein the source of light is configured to continue to trap the at least one particle after the alternating electric field is removed.

3. The system of claim 1, further comprising means for applying a direct current electric field or a low frequency alternating electric field to the fluid medium capable of causing a trapped particle to be printed in the vicinity of the plasmonic nanoantenna and remain fixed after the direct current electric field or a low frequency alternating electric field has been removed and the source of light is no longer illuminating the plasmonic nanoantenna.

4. The system of claim 1, further comprising an imaging system to image the at least one particle in the vicinity of the plasmonic nanoantenna.

5. The system of claim 1, further comprising:
   a first substrate comprising a first electrically conductive layer and having the plasmonic nanoantenna located on the first substrate;
   a second substrate comprising a second electrically conductive layer oppositely dispose the first substrate; and
   a channel between the first and second substrates configured to receive the fluid medium comprising the particles.

6. The system of claim 5, further comprising an insulating layer on the first substrate between the first electrically conducting layer and the plasmonic nanoantenna and preventing electrical contact therebetween.

7. The system of claim 5, wherein the means for applying an alternating current electric field in the fluid medium includes electrical connections that electrically couple the first and second electrically conductive layers to a power source.

8. The system of claim 5, wherein the first electrically conductive layer is formed of a material selected from the group consisting of gold, silver, titanium nitride, zirconium nitride, indium tin oxide, zinc oxide, aluminum-doped zinc oxide, or a combination thereof.

9. The system of claim 1, wherein the nanoantenna is formed of a material selected from the group consisting of gold, silver, titanium nitride, zirconium nitride, indium tin oxide, zinc oxide, aluminum-doped zinc oxide, or a combination thereof.

10. The system of claim 1, wherein the plasmonic nanoantenna is functionally connected to an optical fiber or waveguide.

11. A method of manipulating nanoscale particles, the method comprising:

contacting a fluid medium containing the particles with a plasmonic nanoantenna;

illuminating the plasmonic nanoantenna with a source of light such that the plasmonic nanoantenna acts as a nanoscale heat source resulting in localized heating of the fluid medium creating local gradients in the electrical properties of the fluid medium that yield plasmonic trapping sites in the vicinity of the plasmonic nanoantenna; and applying an alternating current electric field in the fluid medium to create electrothermoplasmonic flow around the plasmonic nanoantenna, wherein the electrothermoplasmonic flow transports at least one of the particles towards the plasmonic nanoantenna, wherein the at least one particle is trapped by at least one of the plasmonic trapping site.

12. The method of claim 11, further comprising removing the alternating current electric field after the at least one particle is trapped and the at least one particle remains trapped.

13. The method of claim 11, further comprising the step of releasing the trapped particle by causing the source of light to no longer illuminate the plasmonic nanoantenna.

14. The method of claim 11, further comprising the step of imaging the at least one particle in the vicinity of the plasmonic nanoantenna.

15. The method of claim 11, further comprising the step of printing the at least one particle by applying a direct current electric field or a low frequency alternating current electric field to the fluid medium, and then causing the source of light to no longer illuminate the plasmonic nanoantenna and removing the direct current electric field or the low frequency alternating current electric field, wherein the at least one particle remains printed in the vicinity of the plasmonic nanoantenna.

16. The method of claim 15, wherein the printing step is repeated to create a nanochip.

17. The method of claim 15, wherein multiple nanomaterials are used to assemble a complex system.

* * * * *